Jan. 22, 1963 C. S. BALAZ 3,074,532
WORKPIECE FEED MECHANISM
Filed Oct. 9, 1959 6 Sheets-Sheet 1

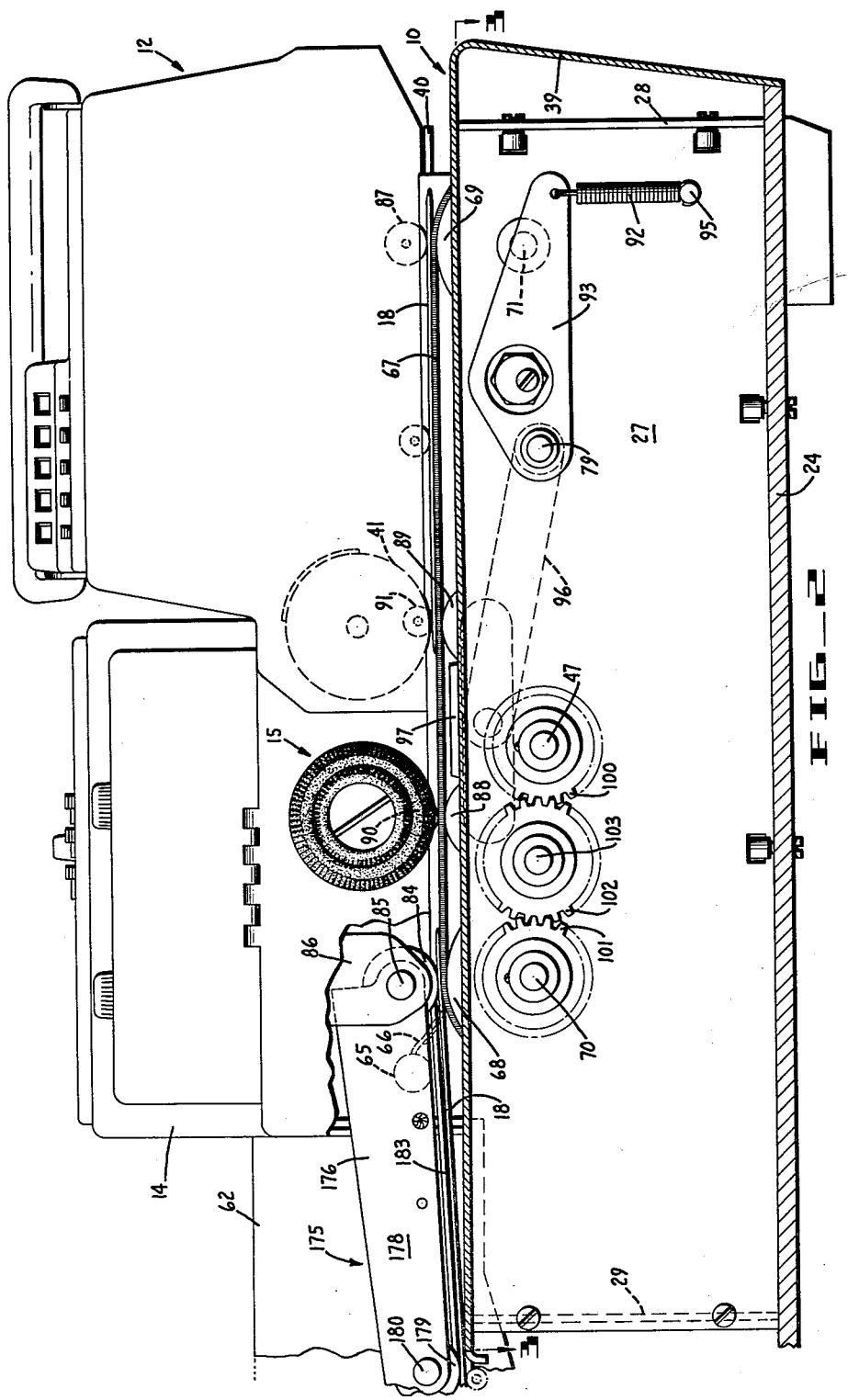

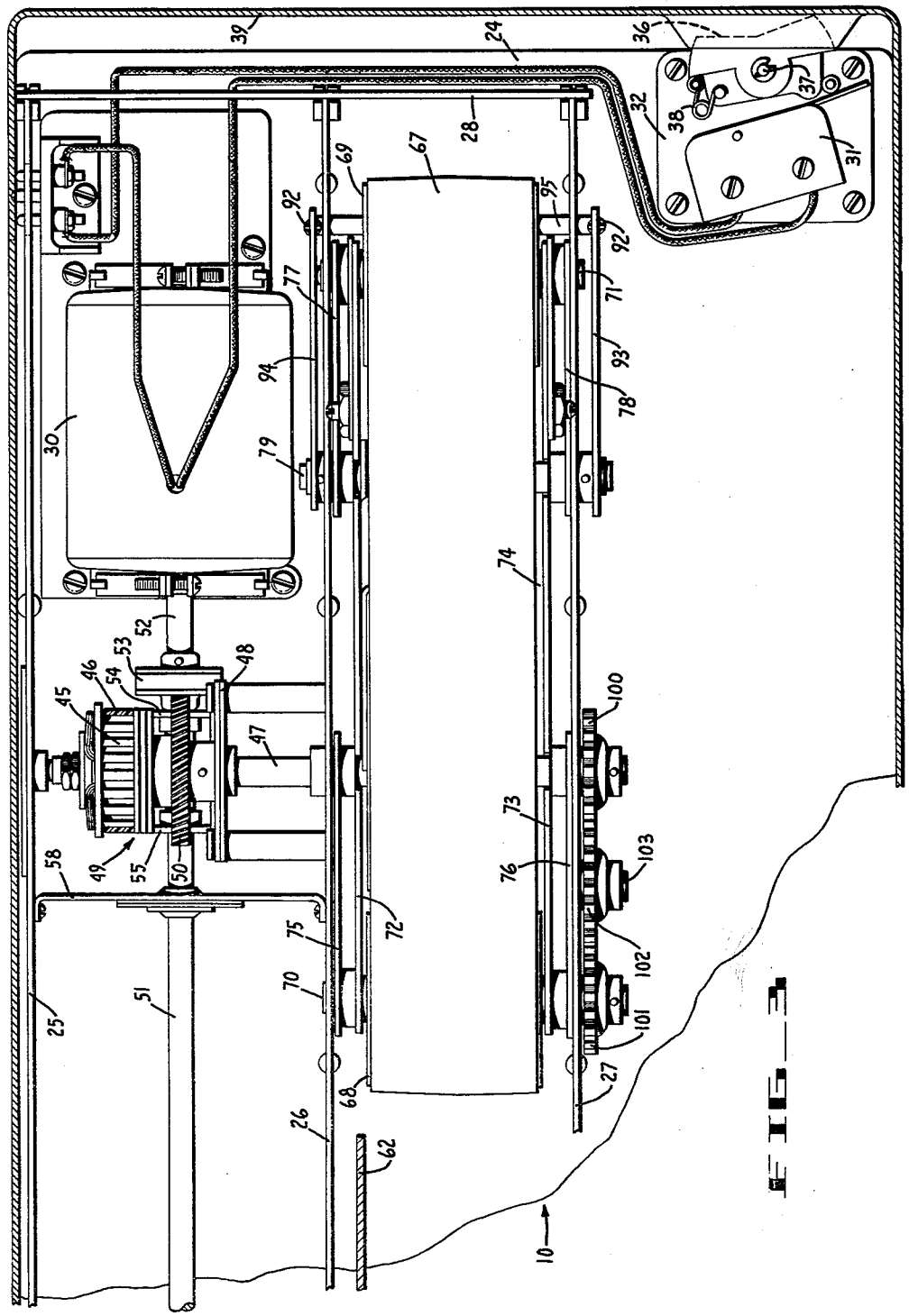

Jan. 22, 1963 C. S. BALAZ 3,074,532
WORKPIECE FEED MECHANISM
Filed Oct. 9, 1959
6 Sheets-Sheet 4
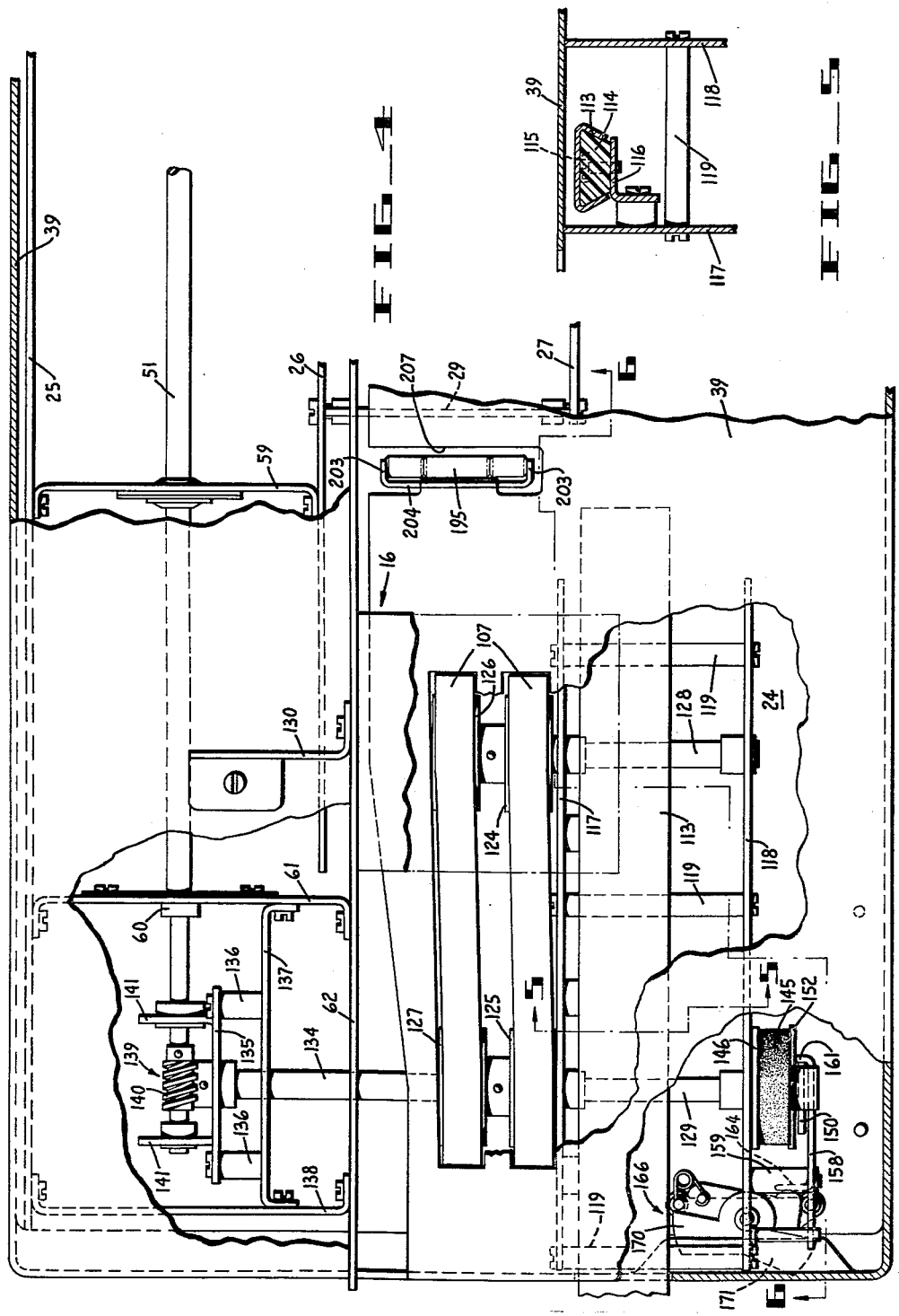

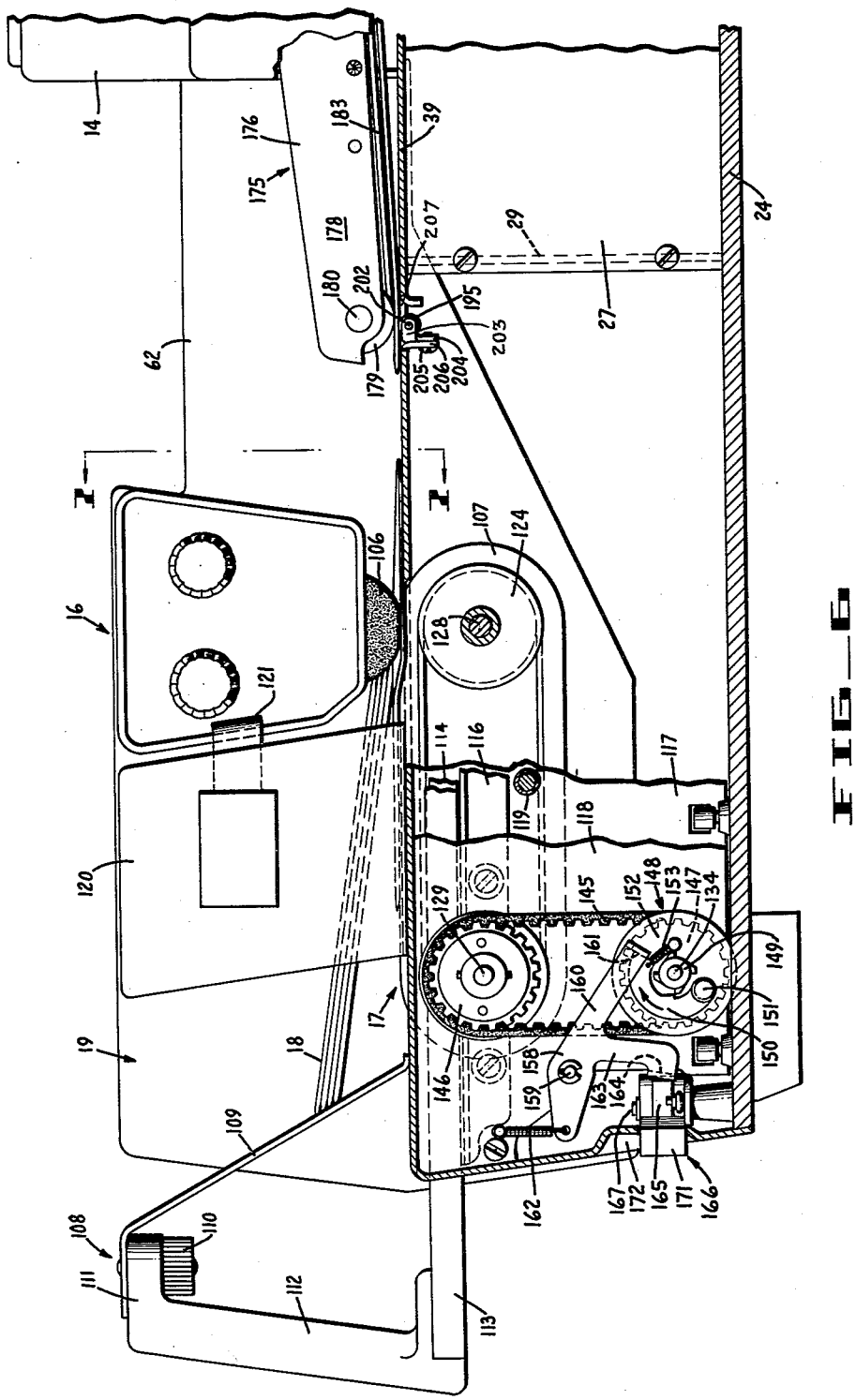

Jan. 22, 1963 — C. S. BALAZ — 3,074,532
WORKPIECE FEED MECHANISM
Filed Oct. 9, 1959 — 6 Sheets-Sheet 6
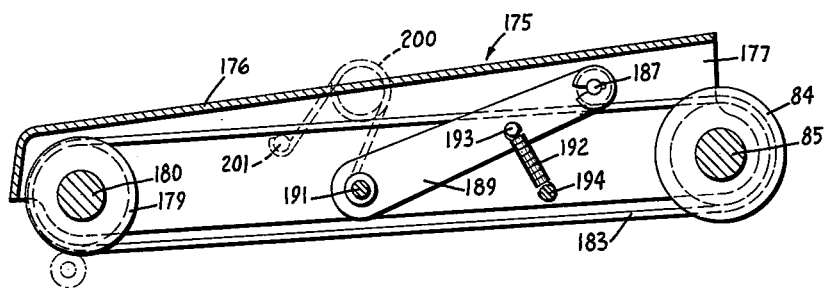
FIG_9
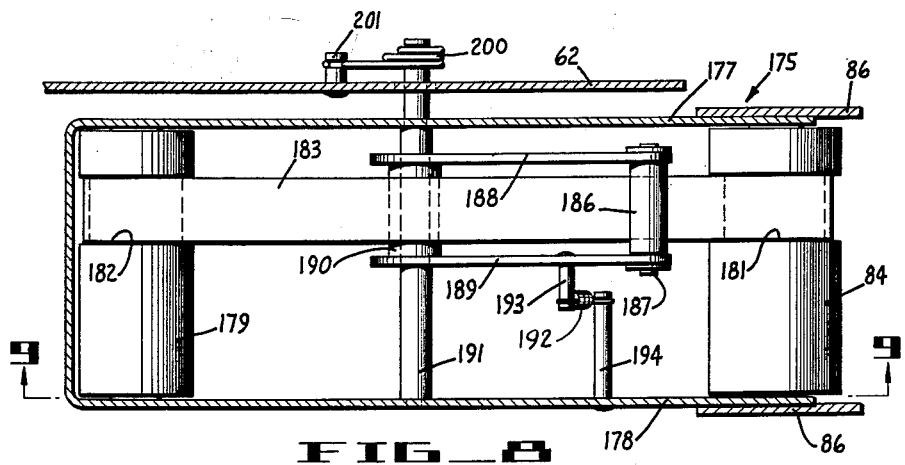
FIG_8
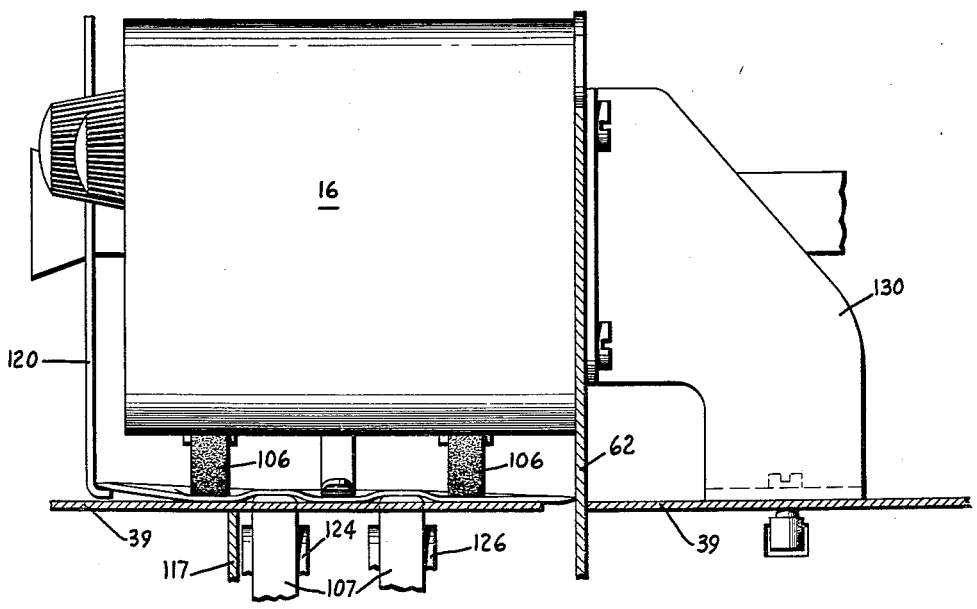
FIG_7

3,074,532
WORKPIECE FEED MECHANISM
Charles S. Balaz, Hayward, Calif., assignor, by mesne assignments, to International Postal Supply Corporation, a corporation of Massachusetts
Filed Oct. 9, 1959, Ser. No. 845,427
4 Claims. (Cl. 198—34)

This invention relates to an improvement in a metered mailing machine, and more particularly to a mechanism for separating workpieces, such as envelopes or letters, one at a time, from the bottom of a stack of superimposed workpieces, and then feeding the workpieces to a printing station.

The method usually employed in stripping or separating letters is commonly known as the "bump feed" method which utilizes a raised portion on the pulley structure to move the belt surface into frictional contact with the bottom surface of the lowermost letter in the stack. Hence, during a predetermined portion of each cycle of rotation of the pulley, the belt surface becomes effective to remove the lowermost letter. The rate at which workpieces of various lengths may feed is constant and is determined by the circumference of the pulley and the surface speed of the belt, the circumference of the pulley being greater than the length of the longest envelope or other matter to be separated during a feeding operation. Assuming the surface speed of the belt to be constant when driven by a "bump" pulley of a given circumference, each envelope or workpiece will feed at the same rate, irrespective of its length, so that an unnecessary loss of operational time is experienced during the feeding of workpieces of shorter lengths.

Due to the irregular circumference of the pulley, the belt must have considerable elasticity so that it might stretch while the "bump" portion of the pulley is in contact therewith and will contract as the "bump" portion of the pulley is moved out of contact with the belt. This expansion and contraction of the belt creates a tendency of the belt to cause the envelopes or workpieces to shift from a straight line feed position during the feeding operation. It has been found, therefore, that with the use of the "bump feed" method of stripping workpieces it is necessary to provide the device with adequate guides which require rather critical adjustment to the width of the workpieces.

Strippers or separators are normally used in combination with the "bump feed" and comprise frictional workpiece engaging members which are adjustable relative to the feeding surface of the belt in the operative position of the "bump" portion of the pulley. These frictional members are provided for the purpose of permitting the feeding of only the lowermost workpiece with each revolution of the pulley. However, it has been found that in the use of this combination a critical adjustment of the frictional members becomes necessary to enable the continuous feeding of the individual workpieces.

There are several types of strippers, but each employs springs in one form or another to resiliently retain the frictional members in their adjusted position. When properly adjusted, the frictional members will yield slightly against the resistance of the springs as each workpiece passes between the belt and the members. If the adjustment of the frictional members is such that a workpiece or letter of one thickness will be permitted to feed, a letter of a fractionally greater thickness will not feed until the pulley has made several rotations. The "bump" portion of the pulley, upon engagement with the forward end portion of the thicker letter to be separated, causes the frictional members to yield and imparts only a small degree of movement to the letter with each rotation of the pulley, eventually removing the letter from the stack.

Thus, when a stack of superimposed letters of varying thicknesses are to be separated, one at a time, several adjustments of the frictional members may be required during the feeding operation to enable the feeding of the letters without interruption.

In the device of the present invention, a continuous feeding operation is effected with but one adjustment of the frictional members and the letters move in an end-to-end fashion in a feed path toward the printing station. Following the successive separation of the letters from the stack, the letters become spaced sufficiently to enable an individual initiation of an operation of the metered mailing machine.

It is, therefore, an object of the invention to provide a metered mailing machine with a continuous feed mechanism for mail matter.

It is another object of the invention to provide an improved mechanism for feeding workpieces in end-to-end fashion from a stack of superimposed workpieces and for spacing the workpieces in their course of travel to the printing station of a metered mailing machine.

A further object of the invention is the provision of an improved feed mechanism for a cyclically operable printing device whereby workpieces to be printed feed continuously in end-to-end fashion from a hopper and are subsequently automatically spaced sufficiently to enable each workpiece to effect a cyclic operation of the printing device.

Other objects and advantages will become apparent from the following description of a preferred embodiment of the invention as illustrated in the accompanying drawings in which:

FIG. 2 is a fragmentary sectional elevational view showing the conveyor belt and auxiliary feed mechanism;

FIG. 3 is a fragmentary plan view of the power unit and conveyor belt, the view being taken on the line 3—3 in FIG. 2;

FIG. 4 is a fragmentary plan view of the mailing device with a portion of the top of the cover broken away to show the letter feed mechanism and drive therefor;

FIG. 5 is a sectional elevational view of the adjustable letter baffle, the view being taken on lines 5—5 in FIG. 4;

FIG. 6 is a longitudinal sectional elevational view of the letter stripper and the selectively operable clutch controlling the continuous drive for the letter feed, the view being taken on lines 6—6 in FIG. 4;

FIG. 7 is a transverse elevational view of the letter stripper showing the relationship between the stripper and feed belt, the view being taken on line 7—7 in FIG. 6;

FIG. 8 is a plan view of the auxiliary letter feed mechanism, the view being taken immediately below the top of the cover therefor; and FIG. 9 is a sectional elevational view of the auxiliary letter feed mechanism, the view being taken on the line 9—9 in FIG. 8.

Figure 1:
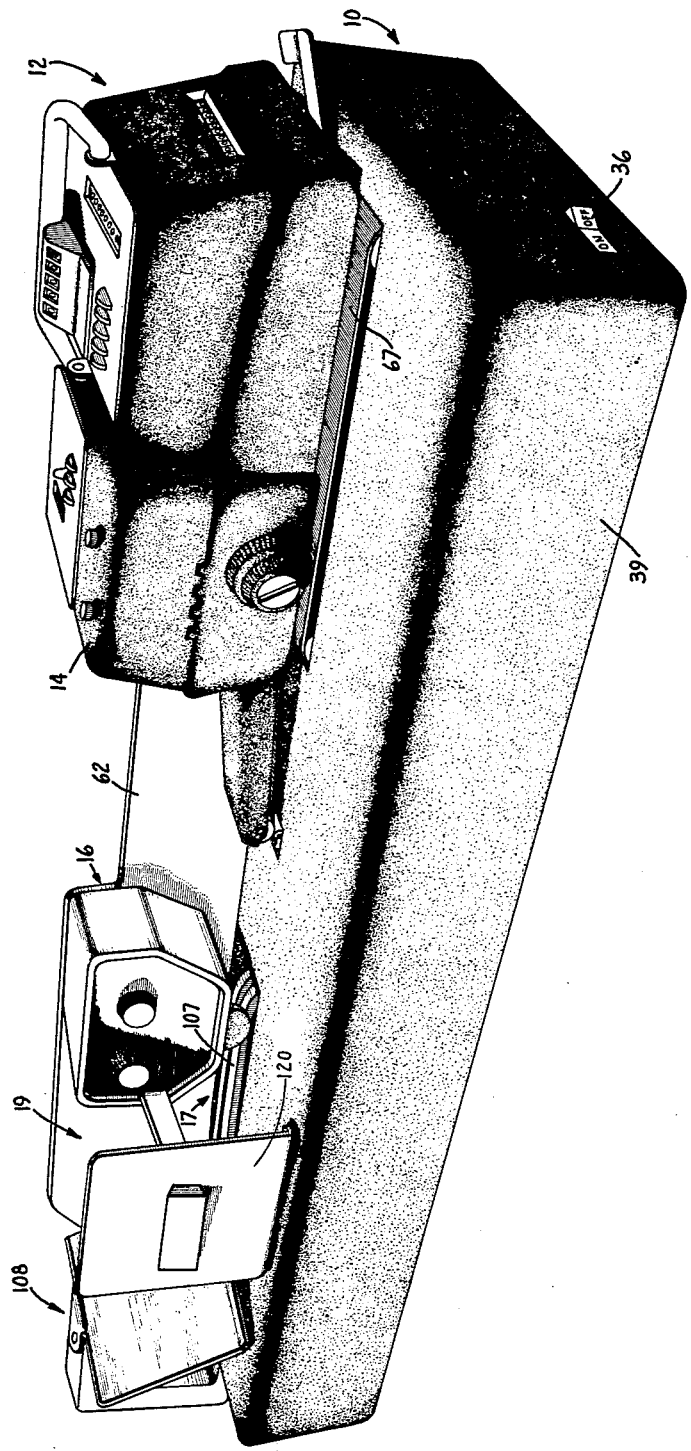
FIG. 1 is an oblique plan view of the metered mailing device.

While this invention may be used in combination with various types of devices, the operation of which may be controlled by the continuous feeding of workpieces, it is preferably shown as embodied in a postage metering machine of the type disclosed in the copending application of Ingemar H. Lundquist, S.N. 801,594, filed March 24, 1959, employing the workpiece separating mechanism disclosed in my copending application S.N. 814,194, filed May 19, 1959 and now abandoned.

In the embodiment chosen for illustrative purposes, the postage metering machine may include a power unit, generally indicated at 10 (FIG. 1), a postage meter unit, generally indicated at 12 and removably mounted on the power unit 10, a suitable housing 14 supported on the power unit 10 and enclosing a cyclically operable driving mechanism (not shown) and an auxiliary printing head driven thereby, and generally indicated at 15 (FIG. 2), a workpiece separating device supported on the power unit 10, and generally indicated at 16, and a continuous workpiece feeding mechanism, generally indicated at 17. The feeding mechanism 17 functions in cooperation with the separating device 16 to separate workpieces, such as sheets, or letters, 18 (FIG. 6), one at a time, in end-to-end fashion from a stack of workpieces positioned within a suitable hopper indicated at 19.

Referring now to FIGS. 2 and 3, the power unit 10 comprises a base 24 having longitudinally disposed frame plate members 25, 26 and 27 secured and maintained in spaced relation thereon by transverse frame members 28 and 29. The motor 30 is secured on base 24 and provides the only source of power for the operating mechanisms of the device disclosed herein. To effect energization of the motor 30, a normally open micro-switch 31 is employed and is secured on a plate 32 which, in turn, is secured on base 24. The operation of the micro-switch 31 is under the control of On-Off switch lever 36 which is rockably mounted on pin 37 carried by plate 32 and is resiliently retained in either of its two positions by means of toggle spring 38 (FIG. 3). For easy accessibility, switch lever 36 projects through a suitable aperture in the end portion of the cover 39 which rests upon the upper edge surface of the frame plate members 25, 26 and 27 and serves to enclose the mechanisms of the power unit 10 and the switch 31.

The postage meter unit 12 is removably mounted and locked in operative position on the base member 40 (FIG. 2) which is secured on the top surface of the cover 39 of power unit 10. Upon operatively positioning the postage meter device 12 on base 40, a gear-driven means is moved into engagement with a cyclic clutch-controlled driving means (not shown) which is contained within the housing 14 and serves to control cyclic rotations of the postage indicia print head 41 within the meter unit 12. The cyclically operable gear-drive means within housing 14 also serves to impart rotation to the auxiliary printing head 15 in synchronism with the indicia printing head 41 in postage meter unit 12. Each cyclic rotation of the auxiliary print head 15 is effective to cause a town circle impression to be made on mail matter passing relative thereto and also to selectively cause an impression of the date, slogan and/or "bulk rate" to be made on each piece of mail matter in proper spaced relation to the postage indicia impression.

Power is transmitted from the motor 30 to the cyclically operable gear drive mechanism by means of a cyclic clutch of well-known construction, the driving side of which is carried by one of similar toothed pulleys 45 (FIG. 3) having a toothed timing belt 46 running thereover. The other of the similar pulleys 45 is rotatably mounted upon the shaft 47 journalled at its respective ends in suitable bearings in frame plate members 25 and 27 and intermediate its ends in frame plate member 26 and bracket 48 supported on the member 26. Rotation is imparted to the toothed pulley 45 on shaft 47 by means of a well-known overload clutch device, generally indicated at 49. The driven side of the clutch 49 is secured to the toothed pulley 45, while the driving side thereof is secured to the worm gear 50 pinned on shaft 47, which gear 50 is enmeshed with a worm (not shown) secured on shaft 51 adjacent one end thereof. Shaft 51 extends longitudinally of the power unit 10 coaxial with motor shaft 52 and is drivingly connected to motor shaft 52 by means of a flexible coupling 53 (FIG. 3). Adjacent its right end, shaft 51 (FIG. 3) is journalled in a suitable bearing in each of the laterally extended parallel ears 54 and 55 of bracket 48 adjacent the respective ends of the worm drive member. Intermediate the ends thereof, shaft 51 is journalled in a suitable self-aligning bearing in each of crossframe members 58 and 59 and in a bearing 60 adjustably mounted on a crossframe member 61 (FIGS. 3 and 4). Each of crossframe members 58 and 59 is disposed between, and is secured at its ends, on frame members 25 and 26, while crossframe member 61 is disposed between, and is secured at its ends, on frame member 25 and intermediate frame member 62 which extends above, and below, the top surface of the power unit cover 39 and serves to define one side of the workpiece hopper 19 and also serves as a support for the workpiece separating device 16. The vertical disposition of the intermediate frame plate 62 is maintained by a bracket 130, one laterally extended ear of which is secured to the upwardly extended portion of the frame member 62 and the other laterally extended ear of which is secured on the top surface of the power unit cover 39.

The engagement of the cyclic clutch, interposed between the motor-driven power transmitting mechanism and the geared driving mechanism for the auxiliary print head 15 and indicia print head 41, is controlled by a counter-clockwise rocking of the shaft 65 (FIG. 2) which extends laterally of the machine and is journalled within the housing 14. To rock the shaft 65, the pressure foot 66 secured thereto is normally positioned to the side of, and adjacent, the conveyor, or feed, belt 67 which is carried by each of similar crown pulleys 68 and 69 secured on respective shafts 70 and 71 (FIGS. 2 and 3). Each of the pulley shafts 70 and 71 is supported in the flanges 72 and 73 of the channel member or conveyor cradle 74 at opposite ends thereof. Shaft 70 is also journalled in suitable bearings in the free end of one arm of each of similar bellcranks 75 and 76, positioned adjacent respective frame plate members 26 and 27 and pivotally mounted for rocking movement on driving shaft 47 (FIG. 3). Similarly, pulley shaft 71 is journalled at its ends in suitable bearings in the free end of one arm of each of bellcranks 77 and 78 which are also positioned adjacent respective frame plate members 26 and 27 and are pivotally mounted on shaft 79 journalled in frame plate members 26 and 27. Each pair of similar bellcranks 75, 76 and 77, 78 normally serve, by means of relatively strong springs (not shown), to resiliently urge the respective pulleys 68 and 69 and feed belt 67 upwardly to the position shown in FIG. 2, wherein the outer top surface of the belt 67 runs in a plane parallel to that of the top of the power unit cover 39. Normally, bellcranks 75 and 76, under the urgency of the relatively strong springs operatively related thereto, resiliently retain the belt 67 in contact with a pressure roller 84 rotatably mounted upon shaft 85 secured at its respective ends in each of similar brackets 86 suitably supported within the housing 14. Similarly, bellcranks 77 and 78 normally serve to urge the pulley 69 upwardly, thereby resiliently maintaining belt 67 in engagement with pressure roller 87 suitably journalled within the postage meter unit 12. In a like manner and in the full-cycle position of the print heads 15 and 41, each of similar impression rollers 88 and 89 serve, respectively, to resiliently retain the top surface of the feed belt 67 in engagement with pressure roller 90, suitably journalled within the auxiliary print head 15, and pressure roller 91, suitably journalled within the indicia print head 41. Upon rotation of the print heads 15 and 41, rollers 88 and 89 also serve as a platen to cause an impression to be made upon mail matter passing between the rotating print heads 15 and 41 and belt 67.

In order to resiliently maintain the top surface of the feed belt 67 in engagement with pressure rollers 90 and 91, or into position to cause an impression to be taken from auxiliary print head 15 and indicia print head 41, each of similar springs 92 (FIGS. 2 and 3) is secured at its upper end in an aperture in the free end of respective arms 93 and 94 secured on the outer extended ends of shaft 79. At its lower end, each spring 92 is supported on the respective ends of a rod 95 secured in frame members 26 and 27, thereby normally urging arms 93 and 94 and shaft 79 in a clockwise direction. At its one end, each of a pair of similar arms 96 is secured on shaft 79 intermediate the flanges 72, 73 of cradle 74, and at its other end each arm 96 is pivotally mounted on the respective flanges of the carrier frame 97 which serves to support the ends of the shafts upon which the impression rollers 88 and 89 are rotatably mounted. The pivotal mounting of each of the arms 96 on the carrier frame 97 is intermediate the rollers 88 and 89 so that, normally, each of the rollers 88 and 89 is urged upwardly, under the influence of the springs 92. However, either roller 88 or 89 may be rocked downwardly, independently of the other, upon passage of mail matter between roller 88 and auxiliary print head 15, or roller 89 and indicia print head 41, during the operation of the metering device.

For power transmission to the feed belt 67, a train of three similar gears 100, 101 and 102 is employed, gear 100 being secured on the outer end of driving shaft 47, gear 101 being secured on the outer extended end of pulley shaft 70 and the third, or intermediate, gear 102 being rotatably mounted on stub shaft 103 which is secured on the pulley shaft supporting arm of bellcrank 76. Upon energization of the motor 30 by the On-Off switch 36, the conveyor, or feed, belt 67 is continuously driven and the surface speed of the feed belt is in ratio to the circumferential speed of the auxiliary print head 15 and the indicia print head 41 which, it will be recalled, rotate in synchronism, one with the other. Normally, upon energization of the electric motor 30, the pressure rollers 90 and 91 mounted within the respective print heads 15 and 41, idly rotate. However, as a letter 18 is moved into position to be frictionally grasped by the belt 67 between the belt and the pressure roller 84, the pressure foot 66 (FIG. 2) is rocked counter-clockwise to effect an engagement of the cyclically operable clutch to initiate cyclic rotation of the print heads 15 and 41. The relative angular position of the printing dies on the auxiliary print head 15 and the indicia die on the print head 41, in the normal full-cycle position of each of the print heads, is such that upon initiation of a metering operation the letter 18, in its course of travel, will be correctly positioned upon reaching the printing stations to receive an impression from each of the print heads 15 and 41.

Inasmuch as the mechanisms described hereinbefore do not constitute a part of the present invention, they are nevertheless indirectly involved. In view of this fact, the description given herein is believed to suffice. However, for a more complete description of these mechanisms, reference is to be had to the copending application S.N. 801,594 of Ingemar H. Lundquist, entitled "Postage Metering Machine."

Referring now to FIGS. 1, 4 and 6, when each of a plurality of letters or workpieces 18 is to receive a printed impression thereon, the stack of letters is positioned in the hopper 19 (FIG. 6) with one edge thereof adjacent the vertically disposed intermediate frame member 62. In order to maintain the stack of letters 18 uniform, the vertically disposed guide plate 120 is employed and is secured on the laterally extended portion of the bar 121, which is slidably mounted in a suitable bracket (not shown) within the stripper unit 16 and is frictionally held thereby in any laterally adjusted position of the plate 120. Upon placing the stack of letters 18 into the hopper 19, the forward, or leading, edge of each letter in the upper portion of the stack abuts the cover of the conventional separator or stripper unit 16, such as that disclosed in my copending application S.N. 814,194 and now abandoned, while the leading edge of each letter in the lower portion of the stack abuts the frictional wheels 106 of the stripper unit 16. The leading edge of the lowermost letter, abutting the frictional wheels 106, is also in contact with the frictional surface of a pair of feed belts 107, which are continuously driven to successively effect a separation of the lowermost letter from the stack of letters 18 and to feed the letters in end-to-end fashion along the top surface of the power unit cover 39. To ensure sufficient frictional contact of the leading edge of the lowermost letter with the top surface of the belts 107, the stack of letters 18 is positioned in the hopper 19 in angular relationship to the top surface of the power unit cover 39. The degree of angularity of the stack of letters 18 relative to the top of the cover 39 is determined by an adjustable slide frictionally maintained in each adjusted position thereof and generally indicated at 108. Plate 109 of the slide 108 is adjustably secured by means of the knurled nut and bolt 110 on the laterally formed arm 111 of a substantially vertically disposed hand grip 112 secured at its lower end on the guide 113. The plate 109 extends angularly downwardly from the supporting arm 111 and, at its lower end, is formed outwardly in a plane parallel to, and adjacent the top of the cover 39. Any desired angular adjustment of the plate 109, relative to the vertically disposed intermediate frame member 62, may be effected by manipulation of the knurled nut 110.

In cross-section the form of the guide 113 is substantially that of a channel, having the two flanges thereof formed angularly inwardly in conformity with the chamfered edges of the bar 114 upon which the guide 113 is slidably mounted. Bar 114 may be made of any suitable material, preferably a thermoplastic material, and is supported by any suitable means, such as a plurality of similar screws 115 (FIG. 5), on the horizontally disposed leg of an angle bracket 116 extending in parallel spaced relation to, and secured on, one frame member 117 of a pair of auxiliary frame members 117 and 118. The auxiliary frame members 117 and 118 are suitably supported upon the base 24 and are maintained in parallel spaced relationship thereon by means of a plurality of similar spacers 119. Thus, it can be seen that the plate 109 may be moved to the left or right (FIG. 6) by slidably moving the guide 113 on bar 114 to attain the required degree of angularity of the letters 18 in accordance with the variance in the length of the letters which may be used.

The continuously operable letter feed mechanism for devices of the type described herein comprises the pair of similar feed belts 107, one of which is carried by a pair of similar grooved pulleys 124 and 125 and the other of which is carried by a pair of similar grooved pulleys 126 and 127. Pulleys 124 and 126 are coaxial and are secured in spaced relation on a shaft 128 journalled at its ends in suitable bearings in the intermediate frame member 62 and auxiliary frame member 118 and, intermediate its ends, in auxiliary frame member 117. Similarly, pulleys 125 and 127, having a diameter equivalent to that of pulleys 124 and 126, are secured in spaced relation on the inner end of a shaft 129 suitably journalled in auxiliary frame members 117 and 118 in parallelism with shaft 128. The spacing between the pulleys 125 and 127 is equal to the spacing between pulleys 124 and 126, thereby providing a parallel relationship between the belts 107. The upper outer surface of the parallel running belts 107 extends through suitable slots in the top of the power unit cover 39 and run in a plane parallel to that of the top of the cover. Also, as viewed from the right in FIG. 4, the pulley 125 of the pair of pulleys 125 and 127 is positioned adjacent the frame member 117, while the pulleys 124 and 126 are axially displaced to the right on shaft 128 out of alignment with the respective pulleys 125 and 127, thereby causing the parallel running belts 107 to run angularly inwardly toward the vertically disposed frame plate 62. Thus, it can be seen that upon clockwise rotation of the pulleys 124, 126 and pulleys 125, 127, as viewed in FIG. 6, and upon the frictional engagement of the lowermost letter of the stack of letters 18 with the belts 107, the inner edge of the lowermost letter will be retained in engagement with the vertical wall of the frame member 62, thereby ensuring true alignment of the letters as they move in the feed path toward the postage metering device, as will be later described.

In addition to supplying power to the conveyor belt 67 and the cyclically operable drive mechanism for the auxiliary print head 15 and indicia print head 41, the electric motor 30 also serves to selectively drive the letter feed belts 107. Power is transmitted from the motor 30 to the feed belts 107 by means of drive shaft 51 (FIG. 4), intermediate drive shaft 134 and driven shaft 129, upon which the grooved pulleys 125 and 127 are secured. Shaft 134 is journalled at its respective ends in suitable bearings in the auxiliary frame member 118 and in a bracket 135 which is supported by means of a plurality of spacer bushings 136 riveted or otherwise secured on the vertically disposed intermediate bracket 137. The bracket 137 is interposed in parallel relationship to frame member 62 and is secured at its respective ends on the auxiliary crossframe members 61 and 138 which, in turn, are secured at their respective ends in parallel relationship on frame member 25 and auxiliary frame member 62. The shaft 134 extends parallel to shaft 129 through suitable apertures in bracket 137 and frame member 62 and is journalled intermediate its ends in a suitable bearing in the auxiliary frame member 117. Power to shaft 134 is derived from the electric motor 30 and drive shaft 51 by means of the worm and worm gear drive unit, generally indicated at 139 (FIG. 4). The worm 140 of the worm and worm gear drive unit 139 is pinned on the shaft 51, adjacent the outer extended end thereof, and is enmeshed with the worm gear of the unit 139 secured on the rearward end of the shaft 134. In order to maintain proper driving relationship between the worm 140 and the worm gear of the unit 139, the outer extended end of the shaft 51 is journalled adjacent each end of the worm 140 in suitable bearings in each of the parallel ears 141 formed outwardly at a right angle to the bracket 135.

Referring now to FIGS. 4 and 6, the transmission of power from the intermediate drive shaft 134 to the pulley shaft 129 is by means of the timing belt 145 carried by each of similar toothed pulleys 146 and 147, the pulley 146 being secured on the outer end of shaft 129 adjacent the auxiliary frame plate 118 and the pulley 147 being rotatably mounted on the outer end of the drive shaft 134, also positioned adjacent auxiliary frame plate 118. Drive shaft 134 becomes effective through the normally engaged pawl and ratchet clutch 148 to impart a clockwise rotation to pulley 147 and a similar rotation to pulley 146 and, therefore, pulley shaft 129. To effect the drive from the shaft 134 to pulley 147, the ratchet 149 of the clutch 148 is secured on the outer end of drive shaft 134 and comprises four equiangularly spaced teeth. Cooperating with the ratchet 149 is the semi-circular pawl 150, pivotally mounted at its one end at 151 on the disk 152 coaxially secured on the free running toothed pulley 147. Pawl 150 is provided with a tooth on the inner arcual surface thereof normally urged by means of the spring 153 into position for engagement by a tooth of the ratchet 149, thereby effecting an engagement of the clutch 148 to initiate the continuous feeding operation of the belts 107.

If, during the operation of the machine, it becomes desirable to terminate the operation of the continuously running belts 107, the drive may be interrupted by the disengagement of the clutch 148. For this purpose, the three-armed bellcrank 158 is pivotally mounted on stud 159 (FIGS. 4 and 6) secured on auxiliary frame plate 118. One arm 160 of the three-armed bellcrank 158 extends angularly downwardly adjacent pawl 150 and is provided at its extremity with an ear 161 formed at a right angle thereto and adapted for engagement by the leading edge of the free end of the pawl 150. A spring 162, supported at its upper end on a pin on auxiliary frame member 118 and engaged at its lower end in an aperture in a second arm of the three-armed bellcrank 158, normally serves to urge the ear 161 on arm 160 into the path of travel of the clutch pawl 150. If the bellcrank 158 is rocked clockwise, under the influence of spring 162, during an operation of the normally engaged clutch 148, the ear 161 will become engaged by the leading edge of the pawl 150, thereby moving the tooth thereon out of engagement with the corresponding tooth of the ratchet 149 to terminate the feeding operation of the belts 107. The third, or depending, arm 163 of bellcrank 158 carries an ear 164 at its lower end disposed at a right angle thereto and normally urged by spring 162 into engagement with a projection 165 of the clutch control button 166. The clutch control button 166 may be of any suitable material, but is preferably formed or molded of a thermoplastic material, and is rockably mounted in a horizontal plane on an upwardly extended pin 167 secured on the base 24. In order to manipulate the button 166, a portion of each of two laterally opposed arms 170 and 171 extends through a suitable aperture in an indentation 172 formed in the end surface of the power unit cover 39. The exposed face of either arm 170 or 171 of button 166 is angularly formed relative to the face of the other arm so that, upon the application of a manipulative pressure on the face of one arm, the major portion of the other arm will be exposed beyond the outer surface of the indentation 172, as seen in FIG. 4. In the condition of the parts, as shown in FIGS. 4 and 6, clutch control button 166 is in its clockwise rocked position and the ear 161 has been rocked into position, under the influence of spring 162, for engagement by the clutch pawl 150, thereby effecting a disengagement of the clutch 148 to prevent operation of the feed belts 107. However, upon rocking clutch control button 166 in a counter-clockwise direction, as viewed in FIG. 4, bellcrank 158 is likewise rocked counter-clockwise against the urgency of the spring 162 to remove the ear 161 from its engagement with the free end of the pawl 150, thereby enabling spring 153 to move the tooth of the pawl 150 into engagement with a tooth of the ratchet 149. Thereafter, the clutch 148 remains engaged to effect a continuous letter feeding operation of the belts 107.

Heretofore, in machines of the type described herein, the so-called "bump feed" method of separating and feeding letters from a stack of letters has been employed. Inasmuch as the circumference of the pulley or wheel having the "bump" portion thereon is of a predetermined length, the letters are fed at a constant speed irrespective of the length of the letter envelope. Also, adequate spacing is thereby provided between the trailing end of one letter and the leading end of the letter following to enable a single cyclic operation of the postage metering device for each letter passing therethrough. Thus, upon initiation of a cycle of operation of the postage metering device by each letter, the postage impression will be properly positioned on the letter upon the arrival thereof at the printing station. Since the length of the circumference of the "bump" pulley is such that the long letter envelopes may be successively fed with an adequate spacing therebetween, there is a considerable loss of time in the feeding operation of shorter letter envelopes.

As explained hereinbefore, the continuously operable feed belts 107 are effective to successively separate and feed the lowermost letter from the stack of letters 18 in end-to-end fashion, irrespective of the length of the letter envelopes in the stack. In the use of the present invention, mechanism becomes effective, following the separation of the lowermost letter from the stack of letters 18, to accelerate the rate of speed of the letter in its path of travel to the printing station, thereby providing sufficient spacing between letters to enable each letter to effect the rocking movement of the pressure foot 66 (FIG. 2) and engagement of the cyclic clutch controlling the cyclic operation of the auxiliary print head 15 and indicia print head 41. For this purpose, an auxiliary feed mechanism is provided and is generally indicated at 175 (FIGS. 2, 6, 8 and 9). As stated above, the pressure roller 84 is rotatably mounted on shaft 85 supported at its ends in each of similar brackets 86 secured within the housing 14. Normally, roller 84 is maintained in frictional contact with the surface of the conveyor belt 67 carried by each of crown pulleys 68 and 69. However, due to the resilient support of the conveyor cradle 74, at either end of which pulleys 68 and 69 are mounted, either pulley 68 or 69 and the feed belt 67 will be moved downwardly in accordance with the thickness of the letter conveyed thereby.

The auxiliary feed mechanism 175 is covered by a canopy 176 having spaced parallel side members 177 and 178, each of which is apertured, adjacent its one end, to rockably support the canopy 176 on shaft 85 and is positioned between the respective ends of the roller 84 and the adjacent brackets 86. Adjacent its other end, each of the side members 177 and 178 of canopy 176 supports the respective ends of a shaft 180 in parallel relation to shaft 85 and upon which a roller 179 is rotatably mounted. The peripheral surface of each of the rollers 84 and 179 is covered with a material having a high coefficient of friction, preferably rubber, and the outside diameter of the roller 84 is greater than that of roller 179. Roller 84 serves to drive roller 179 by means of a flat belt 183 running in annular troughs 181 and 182 within the peripheral surface of rollers 84 and 179, respectively. The inside diameter of each of the belt troughs 181 and 182 is equal so that the roller 179 is driven by the roller 84 at a speed comparable to that of the roller 84 and the depth of the trough 182 in roller 179 is such that the outer running surface of the belt 183 is substantially tangential to the peripheral surface of the roller 179.

In order to maintain belt 183 taut, a roller 186 is rotatably mounted upon a shaft 187 supported at its respective ends in the free end of each of similar arms 188 and 189. At its other end, each of the arms 188 and 189 is secured on the respective ends of a sleeve 190 rockably mounted on a shaft 191 supported in side members 177 and 178 of the canopy 176. Under the urgency of a relatively strong spring 192, sufficient pressure is applied by roller 186 against the running surface of the belt 183 to retain the belt 183 in tension, the spring 192 being supported at its upper end on a pin 193 on arm 189 and at its lower end on a pin 194 secured on side member 178 of the canopy 176.

The canopy 176 may be rocked clockwise from the active position shown in FIGS. 2 and 6 to an inactive position wherein roller 179 is moved out of engagement with a roller 195. The canopy 176 and, therefore, roller 179 are resiliently retained in either the active or the inactive position thereof by means of a relatively strong toggle spring 200 (FIGS. 8 and 9), having its one end looped about a pin 201 on the auxiliary frame member 62 and its other end looped about, and retained in, an annular groove in the reduced diametral end portion of the shaft 191 extending through an arcual slot in the intermediate frame member 62. In the normally active position of the canopy 176, as shown in FIGS. 2 and 6, the toggle spring 200 serves to resiliently retain the roller 179 in engagement with roller 195, rotatably mounted on a shaft 202 secured at its respective ends in similar laterally extended parallel ears 203 of a bracket 204 (FIG. 4). Intermediate its ends, bracket 204 is pivotally mounted at 205 on an ear 206 projecting downwardly at a right angle to the top of the cover 39. Bracket 204 and roller 195 carried thereby are positioned within an open end slot 207 in the cover 39 in a manner such that the surface of the roller 195 extends slightly above the top surface of the cover 39.

It will be recalled that the surface speed of the feed belt 67 is in timed relation to the cyclic rotation of the auxiliary print head 15 and indicia print head 41 so that, following the counter-clockwise rocking movement of the clutch-releasing pressure foot 66 (FIG. 2) by a letter in its path of travel to the printing station, the postage impression will be properly positioned thereon. The mechanism rendered operable by the rocking of the pressure foot 66 to effect engagement of the cyclic clutch is so constructed that the clutch will automatically become disengaged following a complete revolution of the print heads 15 and 41, even though the pressure foot 66 may be retained in its counter-clockwise rocked position, as fully described in the afore-mentioned copending application, S.N. 801,594. In order to effect a re-engagement of the cyclic clutch for the next complete revolution of the print heads 15 and 41, pressure foot 66 must first be returned to the inactive position thereof, as seen in FIG. 2. As explained hereinbefore, upon continuous operation of the feed belts 107, the lowermost letter in a stack of letters 18 of various lengths will be fed successively in end-to-end fashion. Therefore, in order to enable a successive re-engagement of the cyclic clutch to control rotation of the print heads 15 and 41 during a continuous letter feed operation, sufficient spacing must be provided between the trailing end of the leading letter and the leading end of the letter following.

In the embodiment shown and described, the speed of the driving pulley shaft 129 for the feed belts 107 is equal to the speed of the driving pulley shaft 70 for the conveyor belt 67, however, the surface speed of the feed belts 107 is only approximately eighty percent of that of the conveyor belt 67. During a continuous letter feeding operation and upon successive separation of each letter from the stack of letters 18, the leading end of each separated letter is moved by the feed belts 107 into position between rollers 179 and 195 and the movement of the letter is thereafter accelerated to attain the required spacing between letters. This acceleration in the movement of each letter is effected by an increase in the circumferential speed of the roller 179 over the surface speed of the belts 107. It will be recalled that the diameter of the roller 179 is less than the diameter of the roller 84, while the diameter of the roller 84 is less than that of the pulley 68 which, through belt 67, serves to control the rotation of the roller 84. The ratio between the diameters of the pulley 68 and roller 84 is such that the roller 84 will make approximately two and one-half revolutions for each revolution of the pulley 68 and the roller 179 will be driven at the same speed as that of the roller 84. However, the diameter of the roller 179 is less than the diameter of the driving roller 84 so that the circumferential speed of the roller 179 is approximately ninety percent of the surface speed of the conveyor belt 67. Thus, it can be seen that as the leading end of a letter is moved by the feed belts 107 into frictional engagement between roller 179 and the complementary roller 195, the letter will be moved at an accelerated speed to move the leading end thereof into operative engagement with the clutch releasing pressure foot 66 and into frictional engagement with the belt 67 between pulley 68 and roller 84. Thereupon, belt 67 becomes effective to move the letter at a greater speed, conveying the letter into the printing station and beyond in timed relation to the cyclic rotation of the auxiliary print head 15 and indicia print head 41. It becomes apparent, therefore, that upon continuous feeding of a plurality of letters, irrespective of the length of the envelopes, the number of letters or workpieces passing through the postage metering device is greatly increased.

I claim:
1. In a device for spacing successive adjacent workpieces in the direction of feed to a printing station, a hopper for storing a plurality of workpieces, an endless belt for continuously feeding each of said workpieces successively in end-to-end fashion from said hopper toward the printing station, a conveyor belt for continuing the movement of each of said workpieces in the feed path past the printing station, means for continuously driving said endless belt and said conveyor belt, the surface speed of said conveyor belt being greater than the surface speed of said endless belt, an auxiliary feed means in the feed path of said workpieces operable to move said workpieces from said endless belt to said conveyor belt, and means rendered operable by said conveyor belt to direct said workpieces into frictional engagement with said conveyor belt and to drive said auxiliary feed means at a speed greater than the speed of said endless belt and less than the speed of said conveyor belt, whereby the movement of each of said workpieces is accelerated to space the trailing end of one from the leading end of the other of each successive adjacent pair of workpieces.

2. In an apparatus for feeding workpieces to a work station, a hopper for storing a plurality of workpieces, an endless belt for continuously feeding said workpieces successively in end-to-end fashion from said hopper in a feed path toward said work station, a continuously driven conveyor belt for frictionally engaging each of said workpieces subsequent to the feeding thereof by said endless belt and operable to continue the movement of said workpieces to and beyond said work station, a driving means for said endless belt, means driven by said driving means operable to move said conveyor belt at a speed greater than the speed of said endless belt, and a feed means interposed between said endless belt and said conveyor belt including a roller driven by said conveyor belt to control the operation of said feed means at a speed greater than said endless belt and less than the speed of said conveyor belt, whereby the movement of the leading workpiece is accelerated in its path of travel spacing the leading workpiece from the workpiece following to remove the end-to-end relationship therebetween.

3. In a feed mechanism for a mailing machine, the combination of an endless belt for continuously feeding each letter of a plurality of letters successively in end-to-end relationship in a feed path, a continuously driven conveyor belt for frictionally engaging each of said letters subsequent to the operation of said endless belt and continuing the movement thereof, a drive means for said endless belt, means operatively connected to said drive means for effecting movement of said conveyor belt at a speed greater than the speed of movement of said endless belt, pressure means normally in contact with said conveyor belt operable to increase the frictional contact of each of said letters with said conveyor belt upon engagement therewith, and means driven by said pressure means at a speed greater than the speed of said endless belt operable to increase the speed of advancement of a leading letter in its feed path from said endless belt to said conveyor belt thereby spacing the trailing end of the leading letter from the leading end of the trailing letter in the path of travel of the letters.

4. In apparatus of the character described in claim 3, said driven means including a roller for frictionally engaging one surface of the leading letter of successive adjacent letters to advance the leading letter at an accelerated speed, and a spring means for resiliently maintaining said roller in frictional contact with each letter in its course of travel along the feed path.

References Cited in the file of this patent
UNITED STATES PATENTS

| | | |
|---|---|---|
| 650,410 | Morin | May 29, 1900 |
| 1,955,066 | Hiller | Apr. 17, 1934 |
| 2,113,078 | Campbell | Apr. 5, 1938 |
| 2,281,089 | Novick | Apr. 28, 1942 |
| 2,377,522 | Ryan et al. | June 2, 1945 |
| 2,759,729 | Hedlun | Aug. 21, 1956 |
| 2,944,812 | Winkler et al. | July 12, 1960 |
| 2,970,537 | Wardwell et al. | Feb. 7, 1961 |
| 2,979,330 | Weber | Apr. 11, 1961 |